(12) United States Patent
Creelman et al.

(10) Patent No.: US 8,622,623 B2
(45) Date of Patent: Jan. 7, 2014

(54) BEARING UPGRADE AND KIT

(71) Applicant: Babcock Power Services Inc., Worcester, MA (US)

(72) Inventors: Joshua Creelman, West Boylston, MA (US); Mike Boris, Moore, SC (US); Peter Stanwicks, Higganum, CT (US)

(73) Assignee: Babcock Power Services, Inc., Worcester, MA (US)

( * ) Notice: Subject to any disclaimer, the term of this patent is extended or adjusted under 35 U.S.C. 154(b) by 0 days.

(21) Appl. No.: 13/918,410

(22) Filed: Jun. 14, 2013

(65) Prior Publication Data
US 2013/0279840 A1    Oct. 24, 2013

Related U.S. Application Data

(62) Division of application No. 12/616,175, filed on Nov. 11, 2009, now Pat. No. 8,491,196.

(60) Provisional application No. 61/113,366, filed on Nov. 11, 2008.

(51) Int. Cl.
F16C 33/58 (2006.01)
F16C 43/00 (2006.01)
F16C 43/04 (2006.01)

(52) U.S. Cl.
USPC .............................. 384/537; 384/571; 384/584

(58) Field of Classification Search
USPC ................. 384/295, 428, 537, 571, 584, 585; 29/898.061, 898.062, 898.064, 898.07, 29/898.08, 402.09, 402.03
See application file for complete search history.

(56) References Cited

U.S. PATENT DOCUMENTS

| | | | | |
|---|---|---|---|---|
| 2,532,092 A | * | 11/1950 | Frangquist | 241/293 |
| 2,579,238 A | * | 12/1951 | Lippmann | 241/215 |
| 3,465,971 A | | 9/1969 | Dalenberg et al. | |
| 4,002,299 A | | 1/1977 | Skalka | |
| 4,467,971 A | * | 8/1984 | Schuman | 241/215 |
| 4,512,525 A | * | 4/1985 | Cameron | 241/207 |
| 4,538,768 A | * | 9/1985 | Paskowski et al. | 241/101.2 |
| 5,904,307 A | | 5/1999 | Prairie et al. | |
| 8,087,172 B2 | * | 1/2012 | Farris et al. | 29/898.07 |

* cited by examiner

Primary Examiner — Phillip A Johnson
(74) Attorney, Agent, or Firm — Edwards Wildman Palmer LLP; Joshua L. Jones; Alicia J. Esposito

(57) ABSTRACT

A journal bearing assembly includes a journal shaft configured to be mounted in a pulverizer. The journal shaft has a lower bearing receiving surface proximate a lower end thereof, and an upper bearing receiving surface spaced apart from the lower bearing receiving surface axially. A lower journal bearing is mounted on the lower bearing receiving surface of the journal shaft. An upper journal bearing is mounted on the upper bearing receiving surface of the journal shaft. An upper journal housing is mounted on the upper journal bearing for rotational movement relative to the journal shaft. A lower journal housing is mounted on the lower journal bearing for rotational movement relative to the journal shaft. The lower journal housing is mounted to the upper journal housing for common rotation about the journal shaft. The journal bearing assembly has a loading point defined between the upper and lower journal bearings.

16 Claims, 10 Drawing Sheets

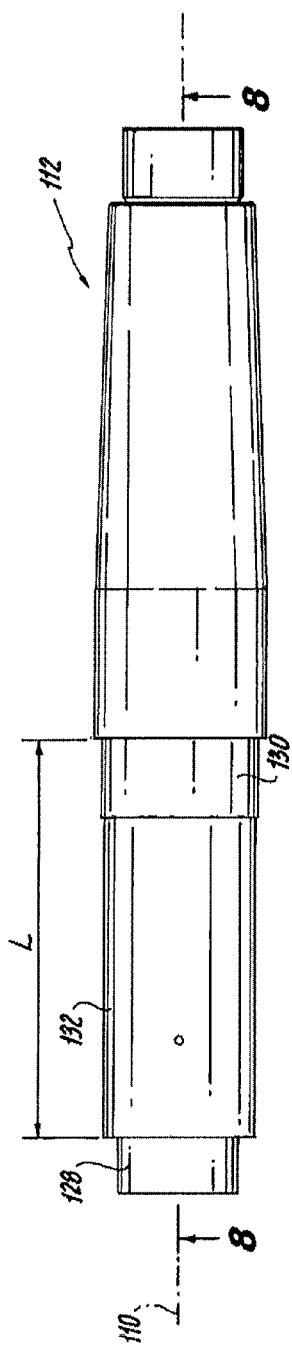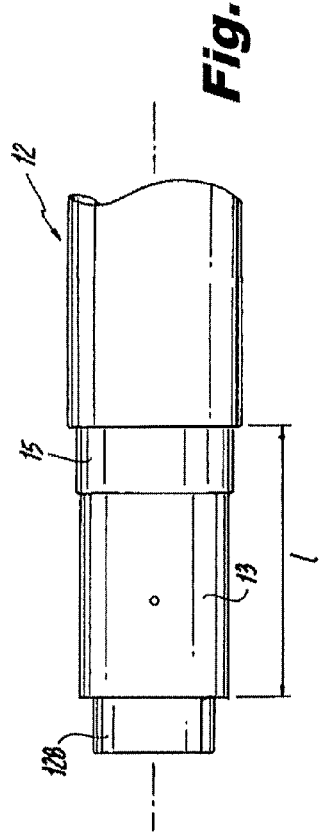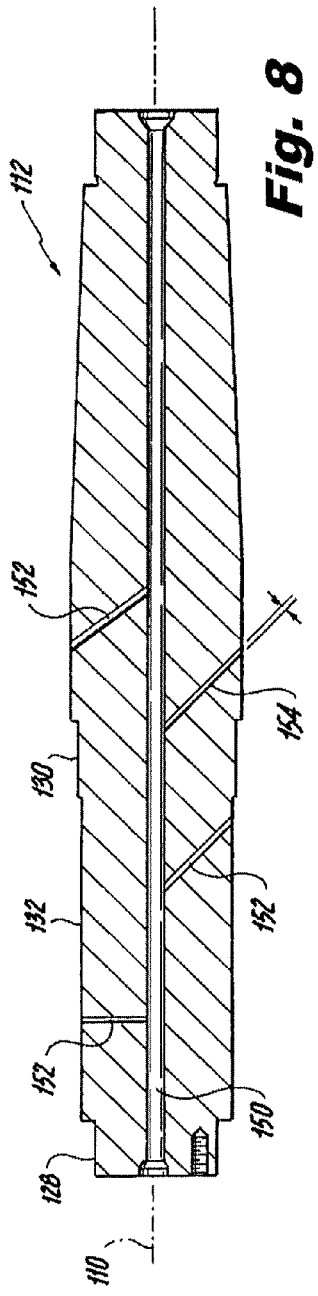

BEARING UPGRADE AND KIT

CROSS-REFERENCE TO RELATED APPLICATIONS

This application is a divisional application of U.S. patent application Ser. No. 12/616,175, filed on Nov. 11, 2009, which claims the benefit of priority to U.S. Provisional Patent Application No. 61/113,366 filed Nov. 11, 2008, the contents both of which are incorporated by reference herein in their entirety.

BACKGROUND OF THE INVENTION

1. Field of the Invention

The present invention relates to particulate size reduction, and more particularly, to journal bearing assemblies for pulverizers.

2. Description of Related Art

A variety of devices and methods are known in the art for reducing particulate size of raw materials. Of such devices, many are directed to pulverizing coal for use as a fuel. In coal-fired furnaces, for purposes of improved and more efficient ignition, it is preferred to pulverize the coal to a fine powder before introducing it into the furnace for combustion.

In operations that use coal for fuel, finely-ground coal particles or "fines" are desirable for efficient operation, yielding higher combustion efficiency than stoker firing, as well as rapid response to load changes. Using coal fines for combustion also produces less nitrous oxide ($NO_x$) emissions and keeps oversized loss-on-ignition (LOT) unburned coal particles from contaminating the marketable ash byproduct of the combustion chamber. Thus, it is common practice to supply raw coal to a device, such as a pulverizer, that will reduce the size of the coal to particles within a desirable range prior to being used for combustion.

Coal pulverization involves systematically comminuting coal to a desired size, e.g., a fine powder, prior to introduction into a coal-fired furnace. Conventional coal pulverization systems include ball tube type mills, high-speed attrition type pulverizers, and vertical roller type mills.

Traditional bowl mill pulverizers are shown and described in U.S. Pat. No. 3,465,971 to Dalenberg, et al., and U.S. Pat. No. 4,002,299 to Skalka, which describe the construction and operation bowl mills suitable for use in coal fired power generation systems. As taught by the patents above, a typical bowl mill includes a body portion in which a grinding table is mounted for rotation, a plurality of grinding rollers that roll against the grinding table to grind coal therebetween, coal supply means for feeding raw coal to the interior of the bowl mill, and air supply means for supplying an air flow to the interior of the bowl mill, which entrains airborne pulverized coal particles for combustion.

In such a bowl mill, the coal enters the bowl mill and is pulverized between the grinding rollers and the grinding table. After being pulverized, the coal particles are thrown outwardly by centrifugal force whereby the particles are fed into a stream of air that is entering the bowl mill. The stream of air, which now contains pulverized coal particles, flows through a tortuous path that is established in part by the positioning of a suitably supported deflector means within the bowl mill. As the stream of air and coal particles flows along the aforementioned tortuous path, the sharp turns effect the separation of the coarse coal particles from the air stream. These coarse coal particles are then returned to the grinding table for further pulverization, while the fine coal particles are carried out of the bowl mill in the air stream. The capacity of each bowl mill of the type described above can be on the order of 100 tons per hour of coal. As the industry has pressed for greater and greater capacity, the size of typical bowl mills has increased in an effort to meet the demand.

With increased size have come issues related to stress and wear. More specifically, prolonged operation of conventional of bowl mills can only last as long as the service life of the weakest components. The pulverizer journal systems typically employed in conventional bowl mills have suffered from one or more of the following undesirable features. It has been found that the upper bearing has been subjected to high radial loading. It has also been found that the lower bearing has been subjected to high thrust loading. Furthermore, it has often been found that the upper bearing does not have the capacity desirable for the loadings encountered during ordinary service.

The result of these factors is that the bearings are often require replacement earlier than the other major components of a typical journal assembly. In order to replace the journal bearings, downtime is required. Thus it is often the case that downtime is incurred due to the bearings per se. The more frequently the need arises to replace the journal bearings, the more the resulting downtime adds up in the long run. Thus, there is a significant need for improvements in the service life of bearing support for journals on which pulverizer rolls are mounted.

The roller of a typical journal assembly is supported by a pair of spaced apart journal bearings. Each journal assembly has a loading point that is typically defined as the intersection point of the longitudinal axis of the journal assembly and the line on which the resulting load acts on the roller. The conventional assemblies were designed to accommodate a hypothetical loading point within the span between the upper and lower bearings. However, in practice, the loading point tends to actually lie outside the span between the two bearings, above the upper journal bearing. If the actual loading point were in fact located at the hypothetical loading point for which the system was designed, radial and thrust loading would have been ameliorated. The actual loading point location results in the undesirable loading factors described above.

The discrepancy between the hypothetical loading point and the loading point in practice is due at least in part to the assumptions made in determining the hypothetical loading point. Earlier assemblies were smaller than more recent assemblies. Assumptions used to determine the loading point that may have been reasonable for smaller assemblies may not be reasonable for determining the loading point of larger assemblies. Roller size, table velocity, and other factors that have increased over the years tend to undermine the original assumptions. Also, due to the smaller size in the earlier assemblies, some error in loading point position could be tolerated with less noticeable effects on service life.

One solution has been to essentially enlarge the upper bearing as described in U.S. Pat. No. 4,538,768 to Paskowski, Jr. et al., which describes using a double tapered roller bearing for the upper journal bearing in place of single tapered roller bearing. Using a larger bearing, or double bearing, can increase the service life of the upper and lower bearings and thus the whole journal assembly. But the cost of the upper bearing is significantly increased. The loading point in this double tapered roller bearing design also falls outside the span between upper and lower journal bearings in practice, despite the hypothetical loading point shown in the Paskowski Patent.

While the conventional methods and systems have generally been considered satisfactory for their intended purposes, there still remains an ongoing need in the art for improved support of journal assemblies that allow for longer service life and less down time. There also remains a need for such methods and apparatus that are easy to make and use. The present invention provides a solution for these problems.

SUMMARY OF THE INVENTION

The subject invention is directed to a new and useful journal bearing assembly for a pulverizer. The journal bearing assembly includes a journal shaft defining a longitudinal axis and being configured and adapted to be mounted in a pulverizer. The journal shaft has a lower bearing receiving surface proximate a lower end thereof, and an upper bearing receiving surface spaced apart from the lower bearing receiving surface axially. A lower journal bearing is mounted on the lower bearing receiving surface of the journal shaft. An upper journal bearing is mounted on the upper bearing receiving surface of the journal shaft. An upper journal housing is mounted on the upper journal bearing for rotational movement relative to the journal shaft. A lower journal housing is mounted on the lower journal bearing for rotational movement relative to the journal shaft. The lower journal housing is mounted to the upper journal housing for common rotation about the journal shaft. The journal bearing assembly has a loading point defined between the upper and lower journal bearings.

In accordance with certain embodiments, the upper journal bearing is a single bearing tapered roller bearing. The journal shaft can include a bearing spacer receiving surface between the upper and lower bearing receiving surfaces, and a bearing spacer can be mounted on the bearing spacer receiving surface of the journal shaft to maintain a minimum spacing between the upper and lower journal bearings.

The invention also provides a journal assembly upgrade kit. The kit includes an annular upper journal housing defining a longitudinal axis and having a radially inner wall and a radially outer wall. The radially outer wall includes a mounting flange configured and adapted for mounting engagement of the upper journal housing with a lower journal housing. The radially inner wall includes a journal shaft approximating surface configured and adapted to accommodate a journal shaft therethrough in close proximity therewith. The inner wall also includes a bearing seating surface configured to receive an upper journal bearing therein so that at least a portion of the upper journal bearing is located axially between the mounting flange and the journal shaft approximating surface of the inner wall with respect to the longitudinal axis.

The kit can include a cylindrical journal bearing spacer defining a longitudinal axis and having radially inner and outer surfaces and first and second end surfaces opposed to one another along the longitudinal axis of the journal bearing spacer. The first and second end surfaces are spaced apart so that when the journal bearing spacer is assembled onto a journal assembly that defines a loading point, with a lower journal bearing adjacent the first end surface and an upper journal bearing adjacent the second end surface, the journal bearing spacer spans across the loading point of the journal assembly. It is also contemplated that the kit can include a journal shaft. In certain embodiments, the kit further includes an annular journal head skirt.

The invention also provides a method of upgrading a journal assembly. The method includes disassembling an original journal head skirt, an original upper journal housing, an original bearing spacer, and an original journal shaft from a journal assembly having a loading point. The method also includes assembling an upgrade journal head skirt, an upgrade upper journal housing, an upgrade bearing spacer, a lower journal bearing, an upper journal bearing that is a single bearing tapered roller bearing, and an upgrade journal shaft onto the journal assembly with the loading point of the journal assembly located between the upper and lower journal bearings.

It is contemplated that the step of assembling can include assembling an upgrade upper journal housing onto the journal assembly, wherein the upgrade journal housing is substantially as described above. The step of assembling can include assembling an upgrade bearing spacer onto the journal assembly wherein the upgrade bearing spacer spans across the loading point of the journal assembly. The step of assembling can include assembling the upgrade journal shaft onto the journal assembly, wherein the upgrade journal shaft is configured and adapted to receive the upper and lower journal bearings such that the upper and lower journal bearings are spaced apart across a span that includes the loading point of the journal assembly.

In certain embodiments, the method further includes the step of modifying the original journal shaft into a modified journal shaft configured and adapted to receive the upper and lower journal bearings such that the upper and lower journal bearings are spaced apart across a span that includes the loading point of the journal assembly. The original journal shaft can include a spacer receiving surface configured and adapted to receive the original bearing spacer thereon and an upper journal bearing receiving surface configured to receive the upper journal bearing thereon. The step of modifying the original journal shaft can include removing material from the original journal shaft to elongate the spacer receiving surface and to relocate the upper journal bearing receiving surface. The original journal shaft can include an internal axial oil bore extending therethrough, and the step of modifying the original journal shaft can include forming a bore from a radially outer journal shaft surface to the internal axial bore.

The method can include a step of modifying the original journal head skirt into a modified journal head skirt configured and adapted to receive the upgrade upper journal housing with a gas seal formed therebetween oblique to a longitudinal axis defined by the upgrade upper journal housing. It is also contemplated that the method can include a step of refurbishing the upper and lower journal bearings.

In certain embodiments, the step of assembling includes assembling the following onto the journal assembly with the loading point of the journal assembly located between the upper and lower journal bearings: the upgrade journal head skirt, wherein the upgrade journal head skirt is the original journal head skirt with at least one modification, the upgrade upper journal housing, wherein the upgrade upper journal housing is a different upper journal housing from the original upper journal housing, the upgrade bearing spacer, wherein the upgrade bearing spacer is a different bearing spacer from the original bearing spacer, and the upgrade journal shaft, wherein the upgrade journal shaft is the original journal shaft with at least one modification.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject application appertains will readily understand how to make and use the devices and methods of the subject invention without undue experimentation, preferred embodiments thereof will be described in detail herein below with reference to certain figures, wherein:

FIG. 6 is a side elevation view of a portion of the journal bearing assembly of FIG. 3, showing the bearing and spacer receiving surfaces of the shaft of the journal bearing assembly;

FIG. 7 is a side elevation view of a portion of the prior art journal bearing assembly of FIG. 2, showing the bearing and spacer receiving surfaces of the shaft of the journal bearing assembly;

FIG. 8 is a cross-sectional side elevation view of a portion of the journal bearing assembly of FIG. 3, showing the internal bores of the journal shaft;

DETAILED DESCRIPTION OF THE PREFERRED EMBODIMENTS

Figure 3:
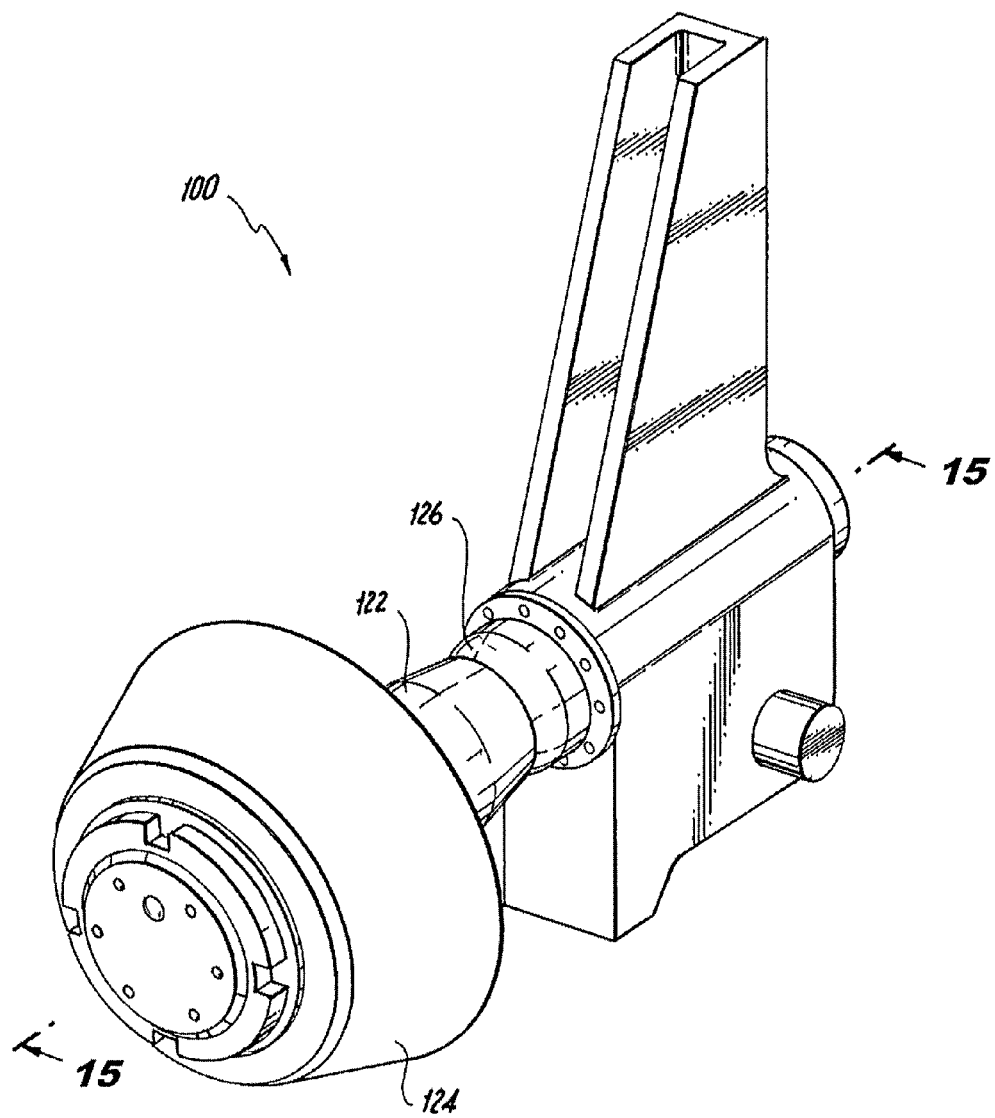
FIG. 3 is a perspective view of an exemplary embodiment of a journal bearing assembly constructed in accordance with the present invention, showing a roller mounted on the journal bearing assembly.
Figure 4:
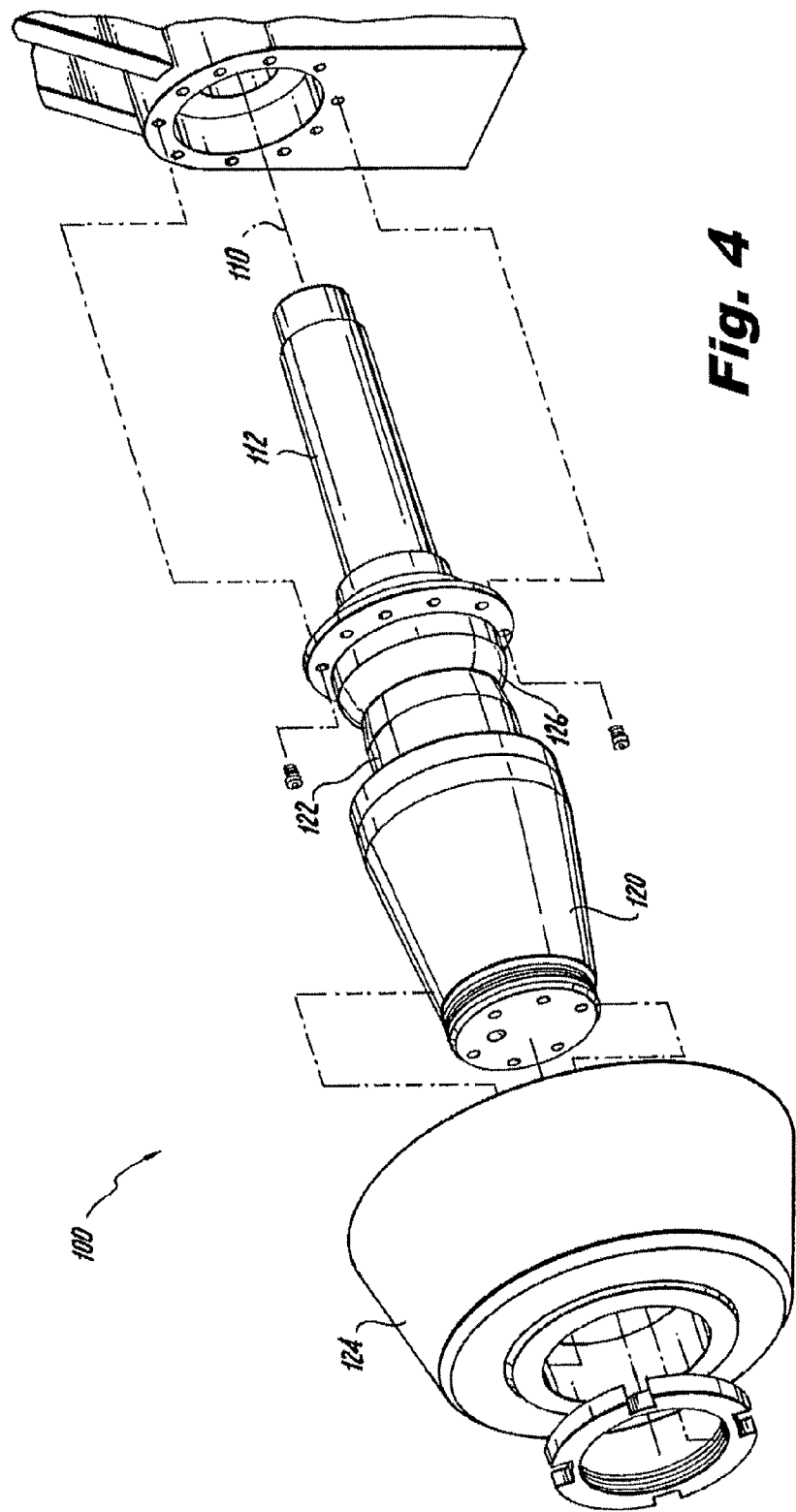
FIG. 4 is an exploded perspective view of the journal bearing assembly of FIG. 3, showing the internal components of the assembly.

Reference will now be made to the drawings wherein like reference numerals identify similar structural features or aspects of the subject invention. For purposes of explanation and illustration, and not limitation, a partial view of an exemplary embodiment of a journal assembly in accordance with the invention is shown in FIG. 3 and is designated generally by reference character 100. Other embodiments of journal assemblies in accordance with the invention, or aspects thereof, are provided in FIGS. 4-15, as will be described. The systems of the invention can be used to enhance particulate size reduction processes, and for example, to increase service life of journal assemblies in pulverizers.

Figure 1:
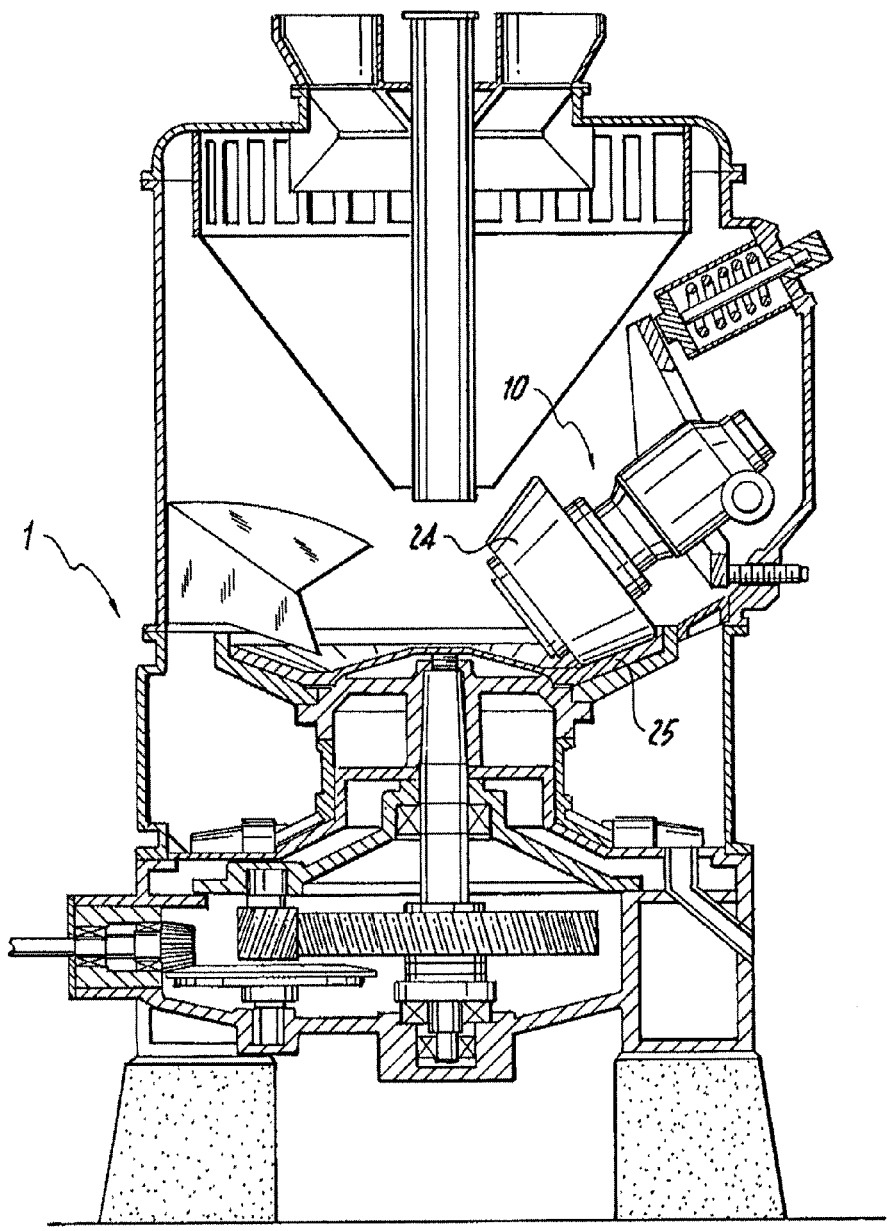
FIG. 1 is a cross-sectional side elevation view of a conventional bowl type pulverizer, showing the journal assembly.
Figure 2:
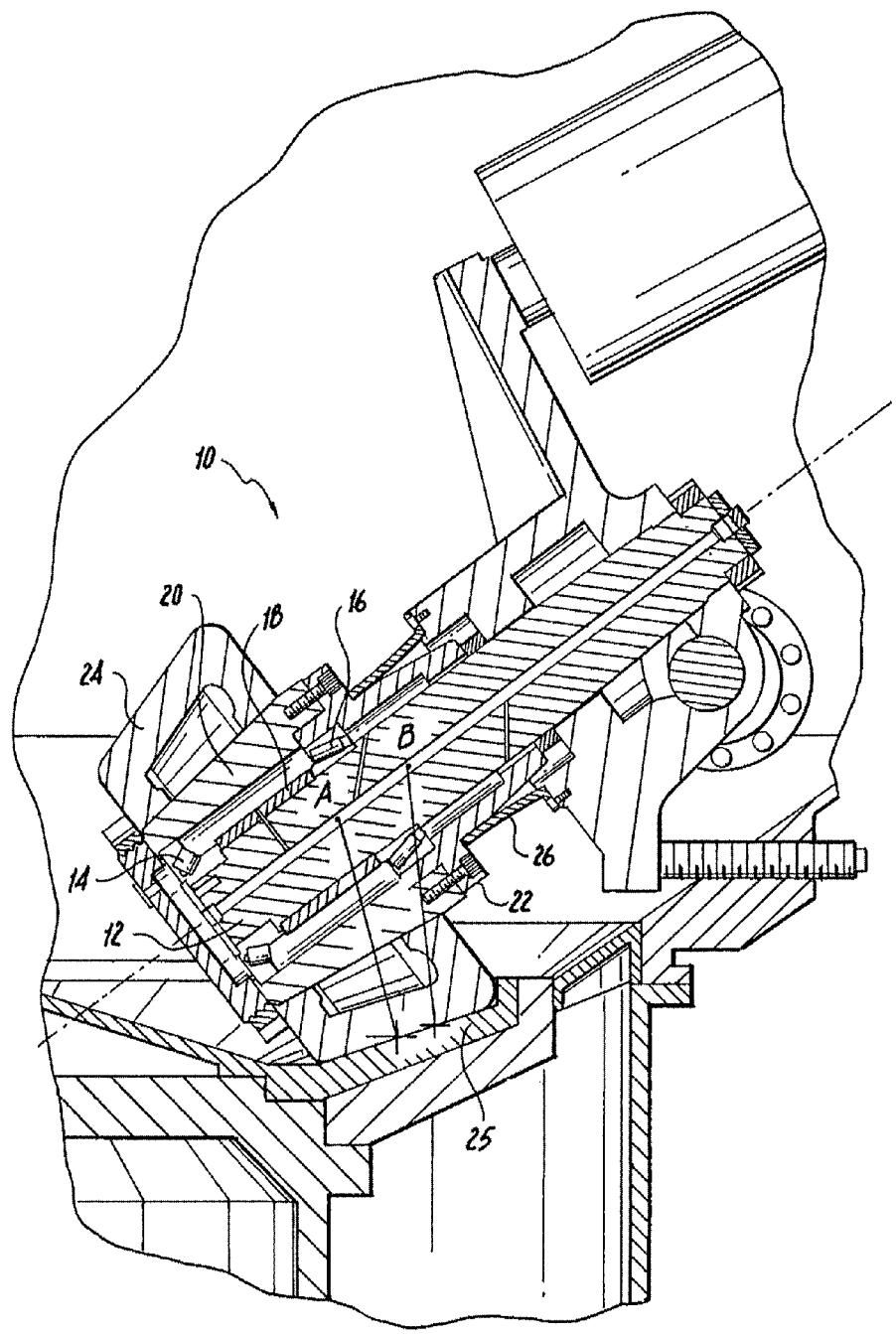
FIG. 2 is a cross-sectional side elevation view of the prior art journal bearing assembly of FIG. 1, showing the upper and lower journal bearings in relation to the hypothetical and actual loading points.

Referring now to FIG. 1, a bowl mill pulverizer 1 is shown, including a prior art journal bearing assembly 10 for allowing rotation of roller 24 against bowl 25 such as when pulverizing coal. As shown in FIG. 2, shaft 12 of bearing assembly 10 defines the longitudinal axis of assembly 10, and is a stationary component with respect to pulverizer 1 in which assembly 10 is installed. A lower bearing 14 is mounted on shaft 12 at one end, and an upper bearing 16 is mounted on shaft 12 spaced axially inward from lower bearing 14. A spacer 18 is mounted on shaft 12 and maintains the spacing between lower and upper bearings 14 and 16. A lower journal housing 20 is mounted on lower bearing 14, and an upper journal housing 22 is mounted on upper bearing 16. Lower and upper journal housings 20 and 22 are bolted together for common rotation about shaft 12 on bearings 14 and 16. Roller 24 is mounted to lower journal housing 20, and is used for grinding material such as coal by rolling over the material on bowl 25. A stationary journal head skirt 26 is in close engagement with upper journal housing 22 to reduce or prevent dust and particles entering the interior of upper journal housing 22.

As a first order approximation, the hypothetical loading point A for the design shown in FIG. 2 lies just inside the span of the longitudinal axis between the lower and upper bearings 14 and 16. Loading point A is the intersection point between the longitudinal axis of shaft 12 and a line drawn perpendicular to the center of the crushing surface of roller 24. The placement of upper bearing 16 just to the right of loading point A suggests the design in FIG. 2 was intended to include loading point A between the upper and lower bearings 14 and 16. However, in practice the actual loading point is at or near loading point B, which is located outside the span between bearings 14 and 16. As a result, it has been found that upper bearing 16 is subjected to high radial loading and lower bearing 14 is subjected to high thrust loading. These undesirable radial and thrust loads result in premature wear of upper and lower bearings 14 and 16, leading to frequent need for replacement in order to keep journal assemblies such as assembly 10 operating.

Referring now to FIGS. 3-6, a journal bearing assembly 100 in accordance with the present invention is shown, which addresses the short comings of the design shown in FIG. 2. Journal bearing assembly 100 is configured for use in a pulverizer, such as in a coal pulverizer, or any other suitable application. Assembly 100 includes a journal shaft 112 defining a longitudinal axis 110. Journal shaft 112 has a lower bearing receiving surface 128 proximate a lower end thereof, and an upper bearing receiving surface 130 spaced apart from lower bearing receiving surface 128 along axis 110.

A lower journal bearing 114 is mounted on lower bearing receiving surface 128 of journal shaft 112. An upper journal bearing 116 is mounted on upper bearing receiving surface 130 of journal shaft 112. An upper journal housing 122 is mounted on upper journal bearing 116 for rotational movement relative to journal shaft 112. A lower journal housing 120 is mounted on lower journal bearing 114 for rotational movement relative to journal shaft 112. Lower journal housing 120 is mounted to upper journal housing 122 for common rotation about journal shaft 112, which is mounted to remain stationary relative to the rotation of bearings 114 and 116. A roller 124 is mounted to lower journal housing 120 and can be used for pulverizing material, as described above. Journal head skirt 126 is mounted to remain stationary with respect to shaft 112 and is closely engaged with the exterior of upper journal housing 122. Journal bearing assembly 100 has a loading point B, shown in FIG. 15, located on axis 110 in the span between lower and upper journal bearings 114 and 116, which corresponds to the actual loading point B in the design of FIG. 2.

Figure 5:
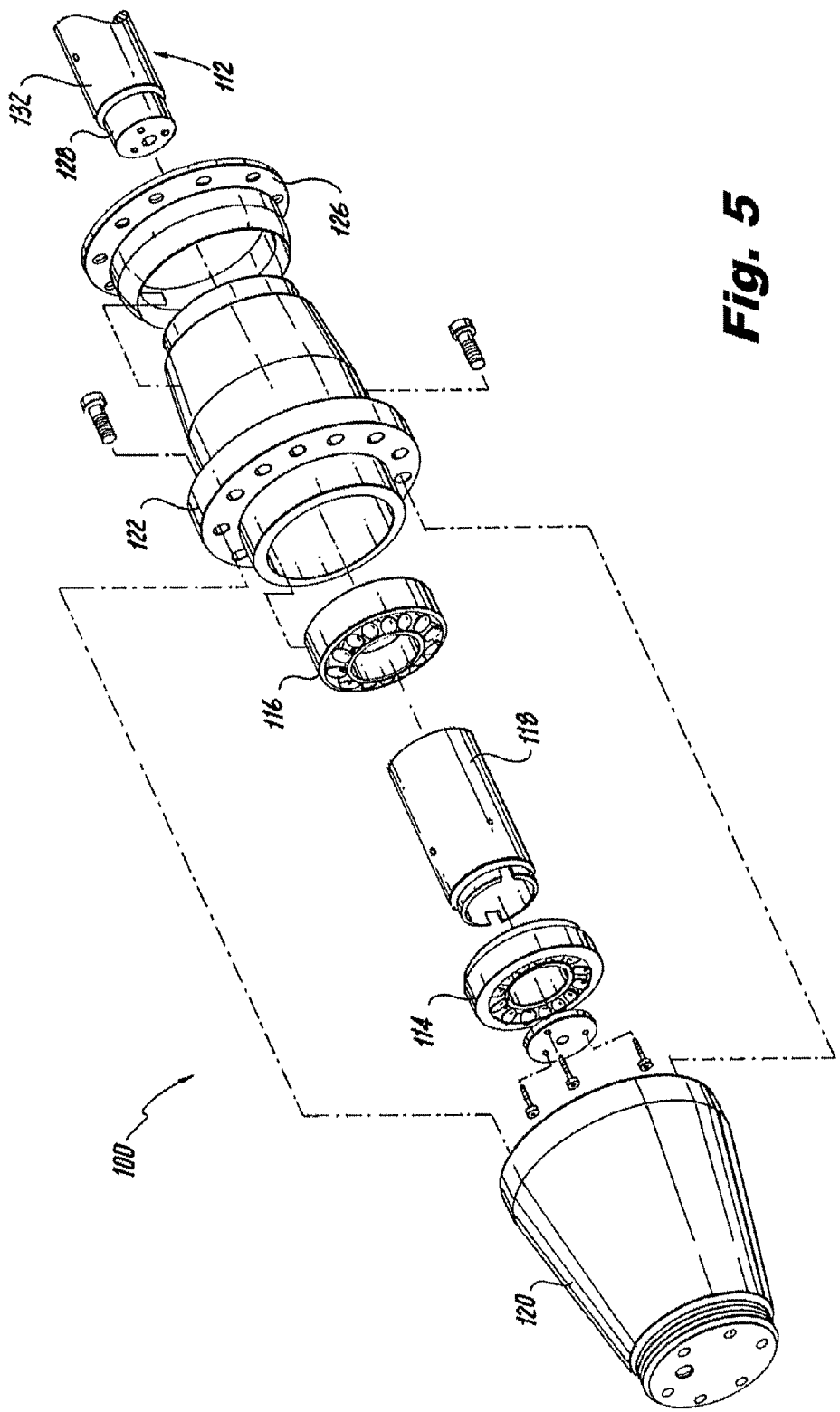
FIG. 5 is an exploded perspective view of a portion of the journal bearing assembly of FIG. 3, showing the upper and lower journal housings separated.

Referring to FIGS. 5-6, Upper journal bearing 116 is a single, tapered roller bearing and can advantageously be of the same general size and configuration as upper bearing 16 in assembly 10. Journal shaft 112 includes a bearing spacer receiving surface 132 between the lower and upper bearing receiving surfaces 128 and 130. Bearing spacer 118 is mounted on bearing spacer receiving surface 132 of journal shaft 112 to maintain a minimum spacing between the lower and upper journal bearings 114 and 116. Lower bearing 114 is single, tapered roller bearing, however any other suitable bearing type can be used without departing from the spirit and scope of the invention.

Figure 9:
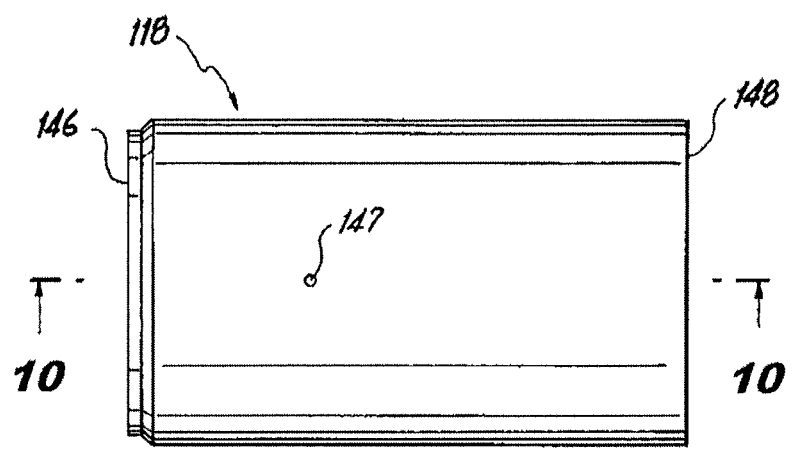
FIG. 9 is a side elevation view of a portion of the journal bearing assembly of FIG. 3, showing the bearing spacer component.
Figure 10:
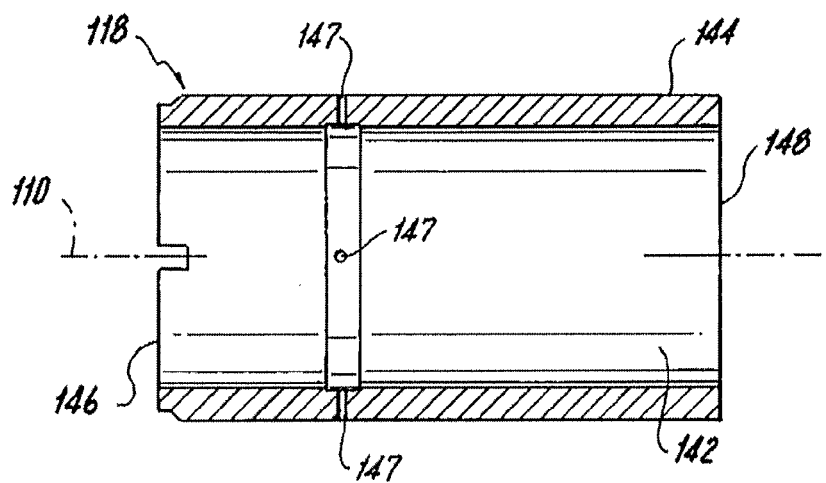
FIG. 10 is a cross-sectional side elevation view of a portion of the journal bearing assembly of FIG. 3, showing the interior of the bearing spacer.
Figure 15:
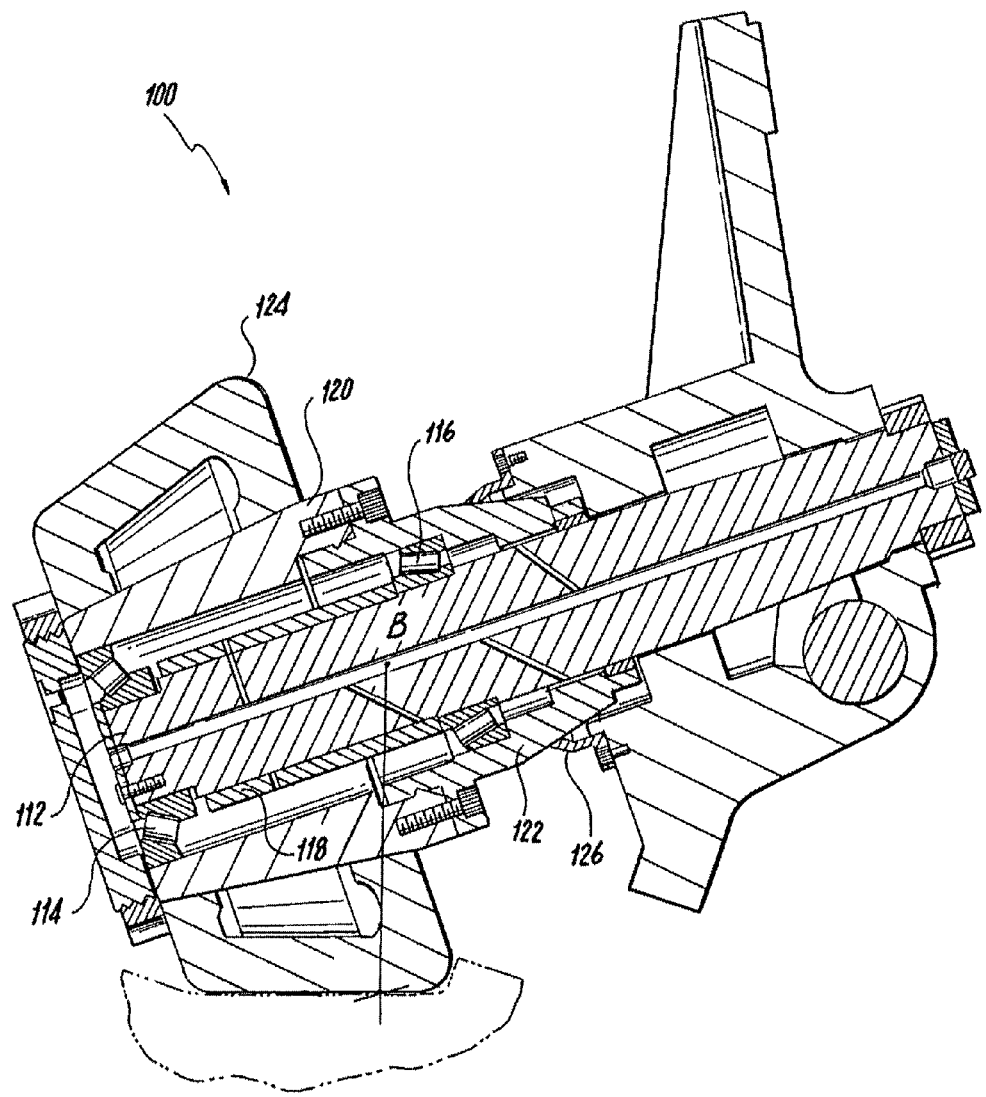
FIG. 15 is a cross-sectional side elevation view of the journal bearing assembly of FIG. 3, showing the interior of the assembly as indicated by section 15-15 of FIG. 3, including the location of the loading point between the upper and lower bearings.

Referring now to FIGS. 9-10, cylindrical journal bearing spacer 118 is shown. Spacer 118 is coaxial with shaft 112, as indicated in FIG. 5, and has a radially inner surface 142 and a radially outer surface 144. Spacer 118 also has first and second end surfaces, 146 and 148, respectively, opposed to one another along longitudinal axis 110. As shown in FIG. 15, first and second end surfaces 146 and 148 are spaced apart so that when spacer 118 is assembled onto spacer receiving surface 132 of shaft 112, with lower journal bearing 114 adjacent end surface 146 and with upper journal bearing 116 adjacent end surface 148, spacer 118 spans across loading point B of journal assembly 100. Spacer 118 also includes a side bore 147 for accommodating passage of lubricant from shaft 112 into the interior of lower journal housing 120.

Figure 11:
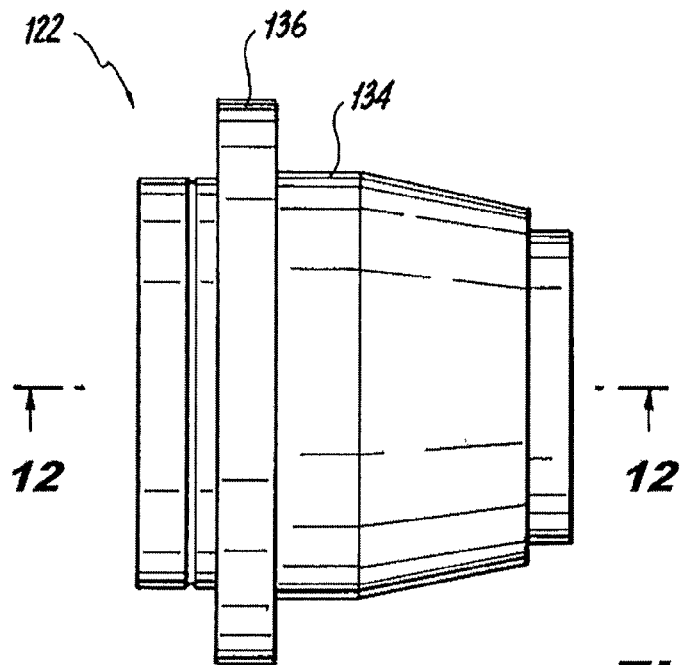
FIG. 11 is a side elevation view of a portion of the journal bearing assembly of FIG. 3, showing the upper journal housing.
Figure 12:
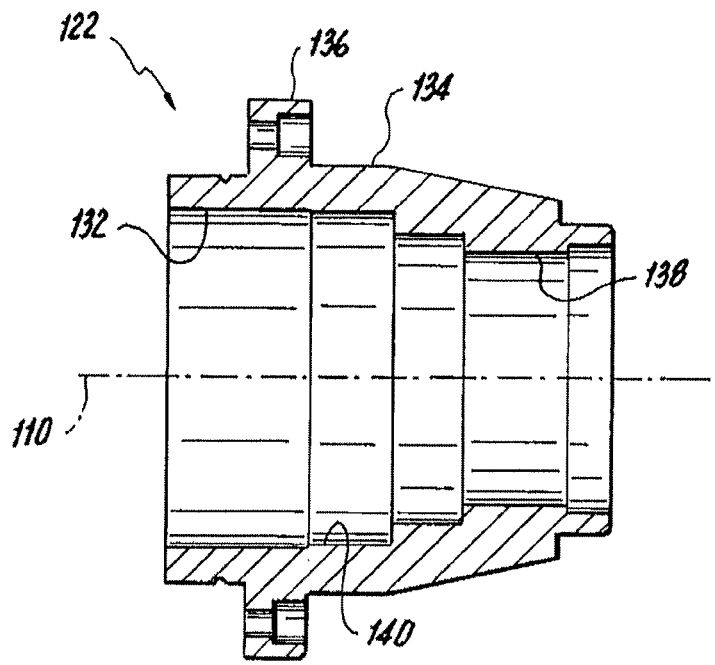
FIG. 12 is a cross-sectional side elevation view of a portion of the journal bearing assembly of FIG. 3, showing the upper journal housing at section 12-12 of FIG. 11.

Referring now to FIGS. 11-12, upper journal housing 122 is annular and is mounted coaxial with shaft 112 as indicated in FIG. 5. Upper journal housing 122 has a radially inner wall 132 and a radially outer wall 134. The radially outer wall 134 includes a mounting flange 136 configured and adapted for mounting engagement of upper journal housing 122 to lower journal housing 120. Radially inner wall 132 includes a journal shaft approximating surface 138 configured and adapted to accommodate journal shaft 112 therethrough in close proximity therewith. Inner wall 132 also includes a bearing seating surface 140 configured to receive upper journal bearing 116 therein with at least a portion of upper journal bearing 116 located axially between mounting flange 136 and journal shaft approximating surface 138 with respect to longitudinal axis 110. Upper journal housing 122, by comparison with upper journal housing 22 in FIG. 2, accommodates upper bearing 116 farther up shaft 112 and is reinforced to provide additional loading capacity.

Figure 13:
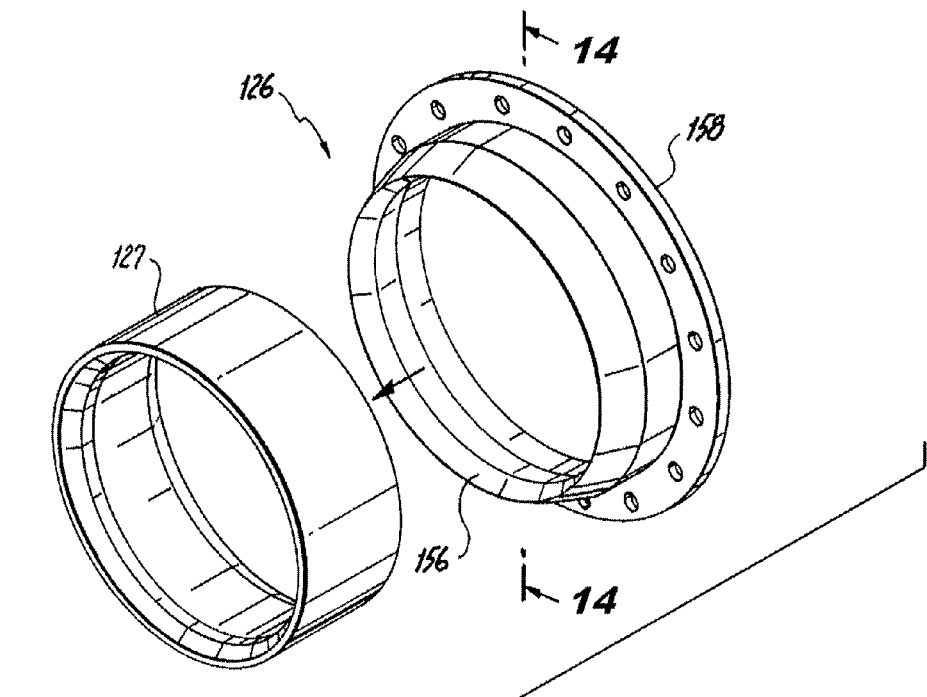
FIG. 13 is a perspective view of a portion of the journal bearing assembly of FIG. 3, showing the journal head skirt and material removed from an original journal head skirt during modification.
Figure 14:
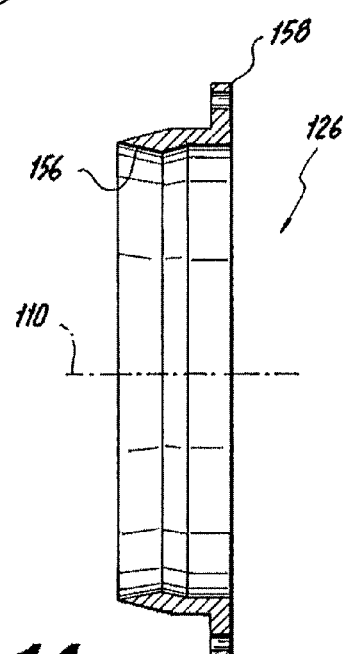
FIG. 14 is a cross-sectional side elevation view of a portion of the journal bearing assembly of FIG. 3, showing the journal head skirt at section 14-14 of FIG. 13.

With reference now to FIGS. 13 and 14, journal head skirt 126 includes an air seal surface 156 that forms a gas seal with radially outer surface 134 of upper journal housing 122 that is oblique to longitudinal axis 110. Flange 158 is used to mount skirt 126 to be stationary with respect to shaft 112.

Referring now to FIGS. 2 and 15, an original journal assembly 10, with an actual loading point B outside the span between lower and upper bearings 14 and 16, can be upgraded into a journal assembly 100 with loading point B inside the span between lower and upper bearings 114 and 116. Original journal head skirt 26, original upper journal housing 22, original bearing spacer 18, and original journal shaft 12 are disassembled from an original journal assembly 10. An upgrade journal head skirt 126, an upgrade upper journal housing 122, an upgrade bearing spacer 118, a lower journal bearing 114, an upper journal bearing 116 that is a single bearing tapered roller bearing, and an upgrade journal shaft 112 are assembled onto the journal assembly to make upgraded journal assembly 100, as shown in FIG. 15.

Referring now to FIGS. 6-8, original journal shaft 12 can be modified into an upgrade journal shaft 112. The modification involves removing material from an original journal shaft 12 to elongate its spacer receiving surface 13 to the full length of bearing receiving surface 132 and to relocate its original upper bearing receiving surface 15 to the location of upper bearing receiving surface 130. The material removed from original shaft 12 to make shaft 112 can be seen by comparing FIGS. 6 and 7. The original length "1" from lower bearing receiving surface 128 to the far side of upper bearing receiving surface 15 on original shaft 12 is elongated to length "L" on shaft 112. The material can be removed from the shaft using standard techniques, such as a lathing process. The bearing receiving surface 132 and spacer 118 shift the position of upper bearing 116 about 7 inches up shaft 112 compared to the bearing position in assembly 10, for example if used on an Raymond® Pressurized Bowl Mills Model Nos. 963, 983, or 1003 model, available from Alstom Engineering of Washington D.C. Referring now to FIG. 8, original journal shaft 12 includes an internal axial oil bore 150 extending therethrough. Original branching bores 152 branch off from axial bore 150 for delivering oil or other suitable lubricants through axial bore 150 to the inside of the journal bearing assembly. Three original branching bores 152 are shown in FIG. 8. As can be seen in FIG. 15, due to the length of spacer 118, the bottom most branching bore 152 is blocked in assembly 100. An additional branching bore 154 is included in shaft 112 to replace the blocked bore 152. During an upgrade from shaft 12 to shaft 112, bore 154 can be formed by any suitable process. Those skilled in the art will readily appreciate that it is not necessary to modify an original shaft into an upgrade shaft, but rather the upgrade shaft can be a new part that replaces an original shaft 12 without departing from the spirit and scope of the invention. Moreover, any suitable bore configuration can be used in a journal shaft without departing from the spirit and scope of the invention.

Referring now to FIGS. 13 and 14, journal skirt 126 can also be a modified version of an original part. FIG. 13 shows the material 127 that can be removed from an original skirt 26 to form skirt 126. The material can be removed by any suitable process, including for example lathing. As with shaft 112 above, it is not required that an original skirt 26 be modified into skirt 126. It is possible to use a new skirt 126 that is not a modified original skirt 26 without departing from the spirit and scope of the invention During an upgrade as described above, it is possible to reuse certain original parts and/or to replace certain original parts in a modified or refurbished condition, and/or to replace certain original parts with new parts to create an upgraded journal assembly 100. One exemplary upgrade procedure is to replace original spacer 18 and original upper journal housing 22 with a new spacer 118 and a new upper journal housing 122, respectively, while modifying shaft 12 and skirt 26 for reuse as shaft 112 and skirt 126, respectively. Since assembly 100 uses lower and upper journal bearings 114 and 116 of the same type as original bearings 14 and 16, respectively, it is possible to either replace the original bearings with new bearings of similar size and configuration, or to simply refurbish the original bearings for continued use.

Upgrade parts for use in upgrading or retrofitting an original journal assembly 10 into an upgraded journal assembly 100 can be provided in a kit. An exemplary kit for such purpose includes an annular upper journal housing, e.g., upper journal housing 122 described above, and a cylindrical journal bearing spacer, e.g., spacer 118 described above. If it is desired to replace rather than modify original shaft 12 and/or original skirt 26, an exemplary upgrade kit can also include a journal shaft, e.g., shaft 112, and/or an annular journal head skirt, e.g., skirt 26, as applicable.

While described above in the exemplary context of bowl mill pulverizers, those skilled in the art will readily appreciate that the systems and methods of the invention can be readily applied to use with other suitable particulate size reduction processes, or any other suitable devices. The methods and systems of the present invention, as described above and shown in the drawings provide for journal bearing assemblies with improved load distribution for longer bearing service life without the need for oversized bearings. Calculations show that bearing life in both upper and lower bearings can be increased by a factor of 3+.

While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A method of upgrading a journal assembly comprising:
   a) disassembling an original journal head skirt, an original upper journal housing, an original bearing spacer, and an original journal shaft from a journal assembly having a loading point; and
   b) assembling an upgrade journal head skirt, an upgrade upper journal housing, an upgrade bearing spacer, a lower journal bearing, an upper journal bearing that is a single bearing tapered roller bearing, and an upgrade journal shaft onto the journal assembly with the loading point of the journal assembly located between the upper and lower journal bearings.

2. A method as recited in claim 1, wherein the step of assembling includes assembling an upgrade upper journal housing onto the journal assembly wherein the upgrade upper journal housing defines a longitudinal axis and has a radially inner wall and a radially outer wall, wherein the radially outer wall includes a mounting flange configured and adapted for mounting engagement of the upper journal housing with a lower journal housing, and wherein the radially inner wall includes a journal shaft approximating surface configured and adapted to accommodate a journal shaft therethrough in close proximity therewith, and a bearing seating surface configured to receive the upper journal bearing therein so that at least a portion of the upper journal bearing is located axially between the mounting flange and the journal shaft approximating surface of the inner wall with respect to the longitudinal axis.

3. A method as recited in claim 1, wherein the step of assembling includes assembling an upgrade bearing spacer onto the journal assembly wherein the upgrade bearing spacer defines a longitudinal axis and has radially inner and outer surfaces and first and second end surfaces opposed to one another along the longitudinal axis, wherein the first and second end surfaces are spaced apart so that when the upgrade bearing spacer is assembled onto the journal assembly with the lower journal bearing adjacent the first end surface and the upper journal bearing adjacent the second end surface, the upgrade bearing spacer spans across the loading point of the journal assembly.

4. A method as recited in claim 1, wherein the step of assembling includes assembling the upgrade journal shaft onto the journal assembly, wherein the upgrade journal shaft is configured and adapted to receive the upper and lower journal bearings such that the upper and lower journal bearings are spaced apart across a span that includes the loading point of the journal assembly.

5. A method as recited in claim 1, further comprising the step of modifying the original journal shaft into a modified journal shaft configured and adapted to receive the upper and lower journal bearings such that the upper and lower journal bearings are spaced apart across a span that includes the loading point of the journal assembly.

6. A method as recited in claim 5, wherein the original journal shaft includes a spacer receiving surface configured and adapted to receive the original bearing spacer thereon and an upper journal bearing receiving surface configured to receive the upper journal bearing thereon, and wherein the step of modifying the original journal shaft includes removing material from the original journal shaft to elongate the spacer receiving surface and to relocate the upper journal bearing receiving surface.

7. A method as recited in claim 6, wherein the original journal shaft includes an internal axial oil bore extending therethrough, and wherein the step of modifying the original journal shaft includes forming a bore from a radially outer journal shaft surface to the internal axial bore.

8. A method as recited in claim 1, further comprising the step of modifying the original journal head skirt into a modified journal head skirt configured and adapted to receive the upgrade upper journal housing with a gas seal formed therebetween oblique to a longitudinal axis defined by the upgrade upper journal housing.

9. A method as recited in claim 1, further comprising the step of refurbishing the upper and lower journal bearings.

10. A method as recited in claim 1, wherein the step of assembling includes assembling the following onto the journal assembly with the loading point of the journal assembly located between the upper and lower journal bearings:
    i) the upgrade journal head skirt, wherein the upgrade journal head skirt is the original journal head skirt with at least one modification,
    ii) the upgrade upper journal housing, wherein the upgrade upper journal housing is a different upper journal housing from the original upper journal housing,
    iii) the upgrade bearing spacer, wherein the upgrade bearing spacer is a different bearing spacer from the original bearing spacer, and
    iv) the upgrade journal shaft, wherein the upgrade journal shaft is the original journal shaft with at least one modification.

11. A method as recited in claim 10, further comprising the step of modifying the original journal shaft by removing material from the original journal shaft to elongate a spacer receiving surface and to relocate an upper journal bearing receiving surface thereof.

12. A method as recited in claim 10, further comprising the step of modifying the original journal head skirt by removing material from the original journal head skirt to form an oblique seal surface configured to be mounted in close proximity with the upgrade upper journal housing to form a gas seal that is oblique to a longitudinal axis defined by the upgrade upper journal housing.

13. A journal assembly upgrade kit comprising an annular upper journal housing defining a longitudinal axis and having a radially inner wall and a radially outer wall, wherein the radially outer wall includes a mounting flange configured and adapted for mounting engagement of the upper journal housing with a lower journal housing, and wherein the radially inner wall includes a journal shaft approximating surface configured and adapted to accommodate a journal shaft therethrough in close proximity therewith, and a bearing seating surface configured to receive an upper journal bearing therein so that at least a portion of the upper journal bearing is located axially between the mounting flange and the journal shaft approximating surface of the inner wall with respect to the longitudinal axis.

14. A journal assembly upgrade kit as recited in claim 13, further comprising a cylindrical journal bearing spacer defining a longitudinal axis and having radially inner and outer surfaces and first and second end surfaces opposed to one another along the longitudinal axis of the journal bearing spacer, wherein the first and second end surfaces are spaced apart so that when the journal bearing spacer is assembled onto a journal assembly that defines a loading point, with a lower journal bearing adjacent the first end surface and an upper journal bearing adjacent the second end surface, the journal bearing spacer spans across the loading point of the journal assembly.

15. A journal assembly upgrade kit as recited in claim 13, further comprising a journal shaft having a radially outer surface including a lower bearing receiving surface and an upper bearing receiving surface spaced apart from the lower bearing receiving surface so that when the journal shaft is assembled into a journal assembly that defines a loading point, with an upper journal bearing mounted on the upper bearing receiving surface and a lower journal bearing mounted on the lower bearing receiving surface, the loading point of the journal assembly is located between the upper journal bearing receiving surface and the lower journal bearing receiving surface.

16. A journal bearing upgrade kit as recited in claim 13, further comprising an annular journal head skirt having an annular skirt body with opposed first and second skirt ends, the first skirt end including a flange configured for attachment of the journal head skirt to a journal assembly, the second skirt end including an oblique sealing surface configured and adapted to form a gas seal with the radially outer wall of the upper journal housing.

\* \* \* \* \*